Jan. 17, 1967　　　J. E. BURKAM ETAL　　　3,298,443
VIBRATION ABSORBING SYSTEM

Filed Dec. 31, 1964　　　　　　　　　　　　　　5 Sheets-Sheet 1

INVENTORS
JOHN E. BURKAM
& EDWARD W. GLATFELTER
BY Visek and McDonnell

THEIR ATTORNEYS

United States Patent Office 3,298,443
Patented Jan. 17, 1967

3,298,443
VIBRATION ABSORBING SYSTEM
John E. Burkam, Media, and Edward W. Glatfelter, Newtown Square, Pa., assignors to The Boeing Company, Seattle, Wash., a corporation of Delaware
Filed Dec. 31, 1964, Ser. No. 422,741
18 Claims. (Cl. 170—159)

This invention relates to a vibration absorbing system and, more particularly, to a vibration absorber for a rotating hub.

One problem in rotary wing aircraft such as helicopters, for example, is the vibrations, which result from the transitional and forward flight of the helicopter and are transmitted to the fuselage through the rotor hub. These vibrations result from the asymmetrical air flow through the rotor wherein the advancing blade encounters higher velocity air than the retreating blade because of the relative movement of the helicopter.

Because of this asymmetrical air flow, each blade of a helicopter rotor experiences a periodic variation of lift as it rotates in azimuth. The combination of this aerodynamic force with the dynamic forces, which result from blade motion, causes periodic forces to be applied to the hub by each of the rotor blades.

The forces, which are applied to the hub, may be expressed as a harmonic (Fourier) series. Because of the symmetrical angular spacing of the rotor blades of a helicopter rotor, the hub forces sum in such a fashion that the predominant force emerging from the rotor blades and into the fuselage through the rotor hub occurs at frequencies of $n$, $2n$, $3n$, etc. times the angular velocity of the rotor where $n$ is the number of rotor blades.

While forcing also occurs at all other multiples of rotor speed because of the inevitable lack of similarity between the rotor blades, the principal forcing frequencies, which are experienced in most helicopters, are those that are a multiple of the product of the angular velocity of the rotor and the number of blades attached to the rotor hub. Furthermore, the frequency at which the principal forcing occurs is usually equal to the product of the angular velocity of the rotor times the number of blades.

If the natural frequency of the fuselage is near one of the forcing frequencies, the helicopter can be subjected to a sufficient vibration level so as to have its performance limited because of both crew and structural fatigue caused by the vibrations. These vibrations normally reach their maximum values at transition, which is approximately 20 to 60 knots, and at high forward speed.

The present invention satisfactorily solves the foregoing problem by providing a vibration absorbing system, which reduces the vibratory motion of the helicopter structure in the planes to which it is applied to a level near zero at the point to which it is attached and significantly decreases the vibration level at most other points in the helicopter fuselage structure. Since the rotor hubs are the points at which the largest forces causing the vibrations are applied, the hubs are then appropriate places to mount the vibration absorber of the present invention in order to reduce the vibratory motion of the fuselage. Since the forces created in any plane by the rotor blades have an elliptical locus in general and rotate in either direction, the present invention substantially balances out these forces by utilizing two circular counter-rotating weight means with different vector components.

Since the elliptical locus can be divided into two components in perpendicular directions, the present invention divides the vibration force at any instance into two perpendicular components. One set of the weight means is employed to substantially balance out the component in one of the perpendicular directions while the other set of weight means is utilized to substantially balance out the component in the other of the perpendicular directions.

If there should be any change in either the phase or the amplitude of the forcing, this changes the shape of the elliptical force locus. However, the counter-rotating weight means of the present invention are moved with respect to each other to compensate for such change.

The present invention can substantially eliminate the vibrations in any plane such as a longitudinal-lateral plane, a vertical-longitudinal plane, or a vertical-lateral plane, for example. The selected plane depends upon which of the vibration producing forces it is desired to cancel.

Accordingly, an object of this invention is to provide a vibration absorber for reducing vibrations, created by radial members of a rotating hub, at the rotating hub.

Another object of this invention is to provide a device for substantially balancing out the vibration forces, which occur at a frequency different than the frequency of a rotating member creating the vibration forces.

A further object of this invention is to provide a vibration absorber that is responsive to change in amplitude or phase of the vibration forces.

Still another object of this invention is to provide a device for substantially balancing out vibration forces, created by the rotor blades, at a rotor hub of a rotary wing aircraft before the forces enter the fuselage of the aircraft.

Other objects of this invention will be readily perceived from the following description, claims, and drawings.

This invention relates to the combination of a rotating hub, a plurality of members attached to the hub and extending radially therefrom, and a vibration absorber to substantially balance out vibrations created at the hub in one plane by the radial members. The vibration absorber includes a first set of rotatably mounted weight means and a second set of rotatably mounted weight means with each of the sets of weight means including at least two equal weights. Each of the weights of the first set of weight means has means connected thereto to cause rotation of the first set of weight means in one direction at an angular velocity equal to a constant ratio of the angular velocity of the hub. Each of the weights of the second set of weight means has means connected thereto to cause rotation of the second set of weight means in a direction opposite to the direction of rotation of the first set of weight means at an angular velocity equal to a constant ratio of the angular velocity of the hub. The axes of rotation of the weights are substantially perpendicular to the one plane in which the vibrations are being substantially balanced out by the vibration absorber. Each of the connected means has means cooperating therewith to cause relative angular movement of one or more of the weights in response to a change in phase or amplitude of the vibrations created at the hub in the one plane by the radial members.

The attached drawings illustrate a preferred embodiment of the invention, in which.

Figure 1:
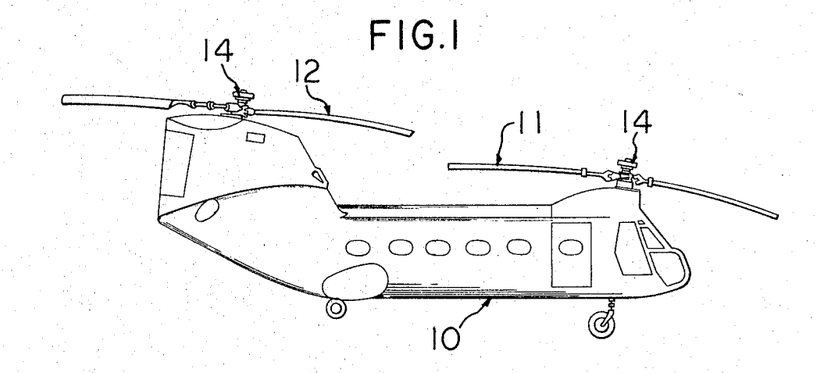
FIGURE 1 is a site elevational view of a helicopter with a vibration absorber of the present invention disposed on top of each set of rotor blades.
Figure 2:
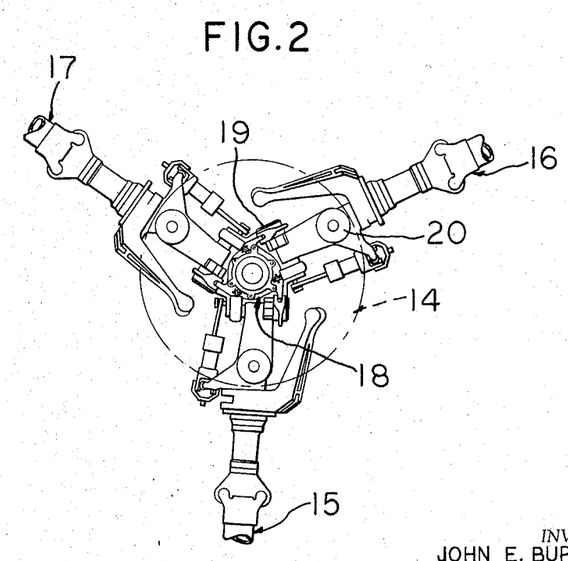
FIGURE 2 is a top plan view of the forward set of rotor blades of the helicopter of FIGURE 1 with the outline of the vibration absorber of the present invention indicated in phantom thereon.
Figure 3:
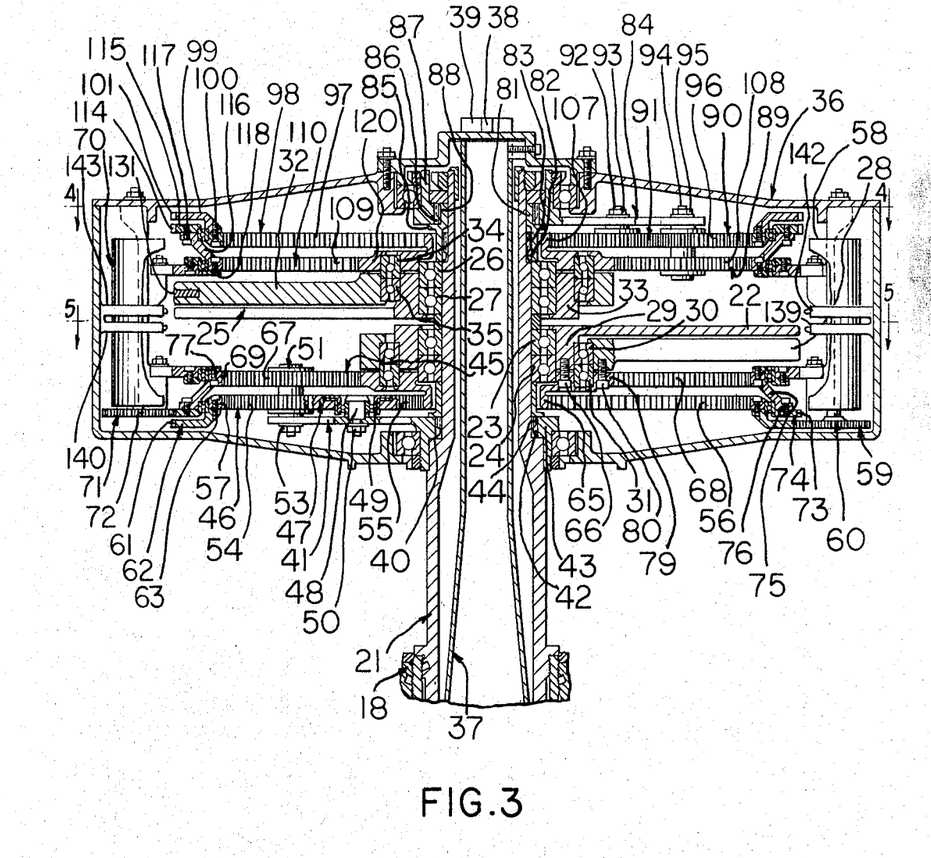
FIGURE 3 is a sectional view, partly in elevation, of the vibration absorber of the present invention.

Referring to the drawings and particularly to FIGURES 1-3, there is shown a helicopter 10 having a forward set 11 of rotor blades and a rear or aft set 12 of rotor blades. Each of the sets 11 and 12 of rotor blades has a vibration absorber 14 disposed on top thereof.

As shown in FIGURE 2, the forward set of rotor blades 11 comprises three rotor blades 15, 16, and 17, which are substantially symmetrically disposed with respect to each other. Each of the rotor blades 15, 16, and 17 is connected to a rotor hub 18, which drives the rotor blades. Each of the rotor blades 15, 16, and 17 is movable in a vertical plane about a flap hinge 19 and in a horizontal plane about a lead-lag hinge 20.

The rear or aft set 12 of rotor blades is driven in the same manner as the forward set 11 of rotor blades and has the same number of rotor blades, which are symmetrically disposed with respect to each other. While the two sets of rotor blades have been shown in a tandem arrangement, it should be understood that they could be disposed coaxially if desired. Furthermore, if desired, only a single set of rotor blades may be employed in the well-known manner.

While the blades have been described as movable about the flap hinge 19 and the lead-lag hinge 20, the blades could be rigid with the rotor hub or movable about a single articulated joint. The number of rotor blades, which are radial members, has been shown as three in each set but this could be any number.

Referring to FIGURE 3, there is shown an annular shaft 21, which is driven by the rotor hub 18 and attached thereto in any suitable manner such as the threaded arrangement of FIGURE 3. An arcuate member 22 is rotatably mounted on the shaft 21 by bearings 23 and 24. A second arcuate member 25, which is the same weight as the arcuate member 22 and has the same configuration, is rotatably mounted on the shaft 21 by bearings 26 and 27.

A third arcuate member 28 is rotatably mounted about a hub 29 of the arcuate member 22 by bearings 30 and 31. A fourth arcuate member 32, which is the same weight as the third arcuate member 28 and of the same configuration, is rotatably mounted on a hub 33 of the second arcuate member 25 by bearings 34 and 35.

While the arcuate members 22 and 25 have the same weight and the arcuate members 28 and 32 have the same weight, each of the members 28 and 32 has a different weight than each of the members 22 and 25. However, it should be understood that each of the arcuate members 22, 25, 28, and 32 could be the same weight.

From the foregoing arrangement, each of the arcuate members 22, 25, 28, and 32 is rotatable about the axis of the annular shaft 21. With the arcuate members 22, 25, 28, and 32 rotatable about the axis of the shaft 21, the members 22, 25, 28, and 32 are disposed to substantially balance out vibrations created in a longitudinal-lateral plane at the rotor hub 18 by the attached blades.

Each of the arcuate members 22, 25, 28, and 32 is rotated at an angular velocity equal to the product of the angular velocity of the rotor hub 18 and the number of blades attached to the rotor hub 18 when it is desired to balance out the principal forcing, which usually occurs at a frequency equal to the product of the angular velocity and the number of blades attached to the rotor hub 18. Thus, since there are three rotor blades attached to the rotor hub 18, each of the arcuate members 22, 25, 28, and 32 rotates at three times the angular velocity of the rotor hub 18 and the connecting shaft 21.

Furthermore, the arcuate members 22 and 25, which are weight means utilized to substantially balance out the vibrations created at the rotor hub in the lateral direction in the longitudinal-lateral plane by the rotor blades, rotate in an opposite direction to the rotation of the shaft 21. The arcuate members 28 and 32, which are weight means utilized to substantially balance out the vibrations created at the rotor hub 18 in the longitudinal direction in the longitudinal-lateral plane by the attached rotor blades, rotate in the same direction as the hub 18 and the connected shaft 21. The members 22, 25, 28, and 32 are preferably formed of steel and tungsten alloy.

The shaft 21 and the arcuate members 22, 25, 28, and 32 are enclosed within a housing 36. The housing 36 is secured to the fuselage of the helicopter 10 by suitable means (not shown) through an annular member 37, which extends inside of the annular shaft 21.

An accelerometer 38 is mounted on top of the housing 36 with its sensing axis positioned in the longitudinal direction in the longitudinal-lateral plane to sense all forces applied to the rotor hub 18 in the longitudinal direction by the attached blades. An accelerometer 39, which has its sensing axis disposed in the lateral direction in the longitudinal-lateral plane, also is mounted on top of the housing 36 to sense forces created in the lateral direction in the longitudinal-lateral plane at the rotor hub 18 by the attached rotor blades. A suitable example of the accelerometers 38 and 39 is the accelerometer, which is sold by the Donner Division of the Systron-Donner Corporation as Model 4575.

While the forces applied to the rotor hub 18 by the rotor blades are specifically alluded to herein since their operation creates the vibratory forces of principle concern, it should be understood that the accelerometers set forth in this invention do not discriminate between forces in the direction being sensed but are obviously responsive to any forces applied along the axis which is being sensed when such forces feed into the structure on which the accelerometers are mounted.

As shown in FIGURE 3, the shaft 21 has a shoulder 40 on which is supported a gear carrier 41. The gear carrier 41 (see FIGURE 5) has teeth 42 (see FIGURE 3) on its hub 43 for meshing with teeth 44 (see FIGURE 3) on the shaft 21 whereby the gear carrier 41 is driven in the same direction as the rotor hub 18 and the connecting shaft 21.

Figure 5:
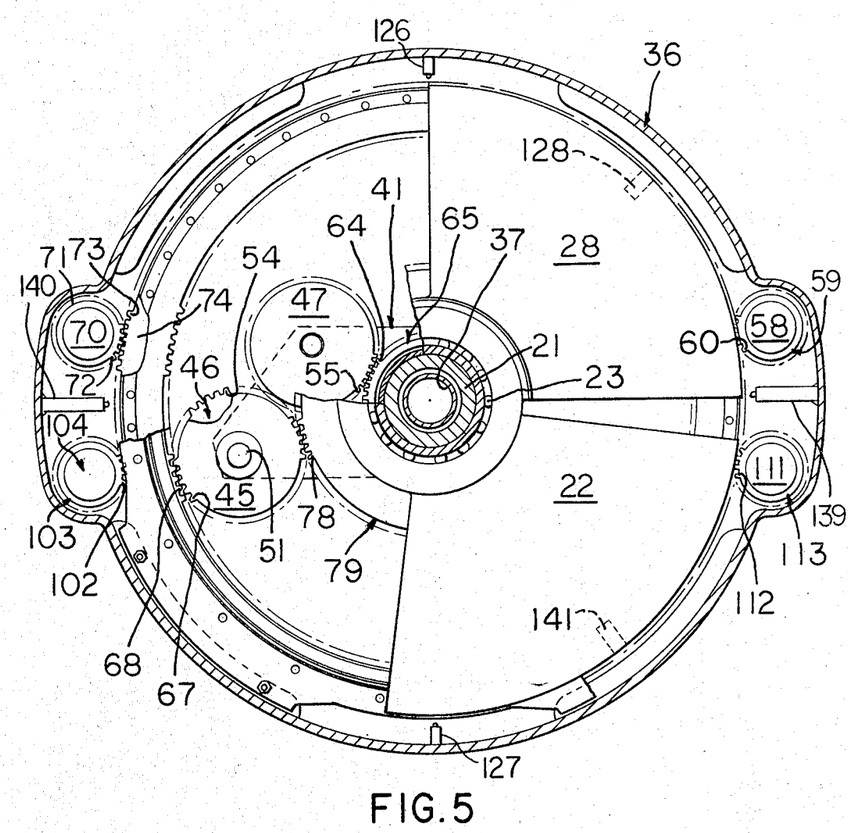
FIGURE 5 is a sectional view, partly in plan, taken substantially along the line 5—5 of FIGURE 4.

The gear carrier 41 supports gears 45, 46, and 47 for movement therewith. The gear 45 is disposed above the gears 46 and 47, which are in the same horizontal plane. The gear 47 is rotatably mounted with respect to the gear carrier 41, which supports it, through a stud 48 and a bearing 49. The stud 48 has its lower end threaded for cooperation with a nut 50 whereby the stud 48 is fixed to the gear carrier 41. Because of the bearing 49, however, the gear 47 is rotatable about the axis of the stud 48.

Each of the gears 45 and 46 is rotatably mounted on a stud 51 by a bearing (not shown). The bearings are similarly arranged as is the bearing 49 on the stud 48. The stud 51 is secured to the gear carrier 41 by a nut 53, which cooperates with the lower threaded end of the stud 51.

The gear 46 has its teeth 54 (see FIGURE 3) meshing with teeth 55 on the gear 47 and teeth 56 on the inner wall of an annular member 57, which may be considered a ring gear. The annular member 57 is normally fixed but is movable with respect to the gear 46 whenever a servomotor 58 is energized. The servomotor 58 has a gear 59 attached thereto. The gear 59 has its teeth 60 meshing with teeth 61 on the outer wall of an annular member 62, which is secured to the annular member 57 by suitable fastening means such as bolts 63.

The teeth 55 of the gear 47 also mesh with teeth 64 (see FIGURE 5) on the outer wall of an annular member 65, which is secured to the hub 29 of the arcuate member 22 by suitable fastening means such as bolts 66 (one shown). Thus, as the gear carrier 41 is rotated by the shaft 21, the gears 46 and 47 are carried therewith and function as planet gears.

If the shaft 21 is rotating clockwise, the gear carrier 41 also rotates clockwise. Because the annular member 57, which is the ring gear, is normally fixed through the gear 59 of the servomotor 58, clockwise rotation of the carrier 41 causes counter-clockwise rotation of the gear 46 about the stud 51. This results in the planet gear 47 being rotated in a clockwise direction about the stud 48. Clockwise rotation of the planet gear 47 causes counter-clockwise rotation of the annular member 65, which is functioning as a sun gear, about the axis of the shaft 21. This counter-clockwise rotation of the annular member 65 causes counter-clockwise rotation of the arcuate member 22 about the axis of the shaft 21 whereby it rotates in the opposite direction to rotation of the hub 18.

The teeth on the various members are arranged so that the arcuate member 22 rotates at three times the angular velocity of the rotor hub 18. Of course, if the number of blades were other than three, then the relationship of the number of teeth on the gear 46, the gear 47, the member 57, and the member 65 would be varied so that the angular velocity of the arcuate member 22 would be equal to the product of the angular velocity of the hub 18 and the number of rotor blades attached to the rotor hub 18.

The planet gear 45, which is carried by the gear carrier 41 and spaced vertically above the gear 46, has its teeth 67 (see FIGURE 5) meshing with teeth 68 on an annular member 69, which functions as a ring gear. The annular member 69 is connected to a servomotor 70 and adapted to be moved thereby for movement with respect to the gear 45.

The servomotor 70 has a gear 71 with teeth 72 thereon for meshing with teeth 73 on a gear 74. The gear 74 is secured to one end of an annular member 75 by suitable fastening means such as bolts 76 while the other end of the member 75 is connected to the annular member 69 by suitable fastening means such as bolts 77. The teeth 67 of the gear 45 also mesh with teeth 78 (see FIGURE 5) on a sun gear 79, which is attached by suitable fastening means such as bolts 80 (one shown) to the arcuate member 28.

Thus, with the gear carrier 41 rotating clockwise because of clockwise rotation of the shaft 21 by the rotor hub 18, the planet gear 45 rotates counter-clockwise about the stud 51 since the annular member 69, which is functioning as the ring gear, is normally fixed. The counter-clockwise rotation of the planet gear 45 causes clockwise rotation of the sun gear 79 about the axis of the shaft 21 whereby the arcuate member 28 is driven in the same direction as the rotor hub 18.

The relation of the number of the teeth 67 on the planet gear 45, the number of the teeth 68 on the annular member 69, and the number of the teeth 78 on the sun gear 79 is arranged so that the arcuate member 28 rotates at three times the angular velocity of the rotor hub 18. Of course, if the number of blades were other than three, then the relationship of the number of teeth would be varied so that the angular velocity of the arcuate member 28 would be equal to the product of the angular velocity of the rotor hub 18 and the number of rotor blades attached to the rotor hub 18.

Energization of the servomotor 70 causes rotation of the annular member 69 whereby the annular member 69 moves relative to the planet gear 45 and the sun gear 79. This varies the position of the arcuate member 28 with respect to the remainder of the arcuate members 22, 25, and 32.

Figure 4:
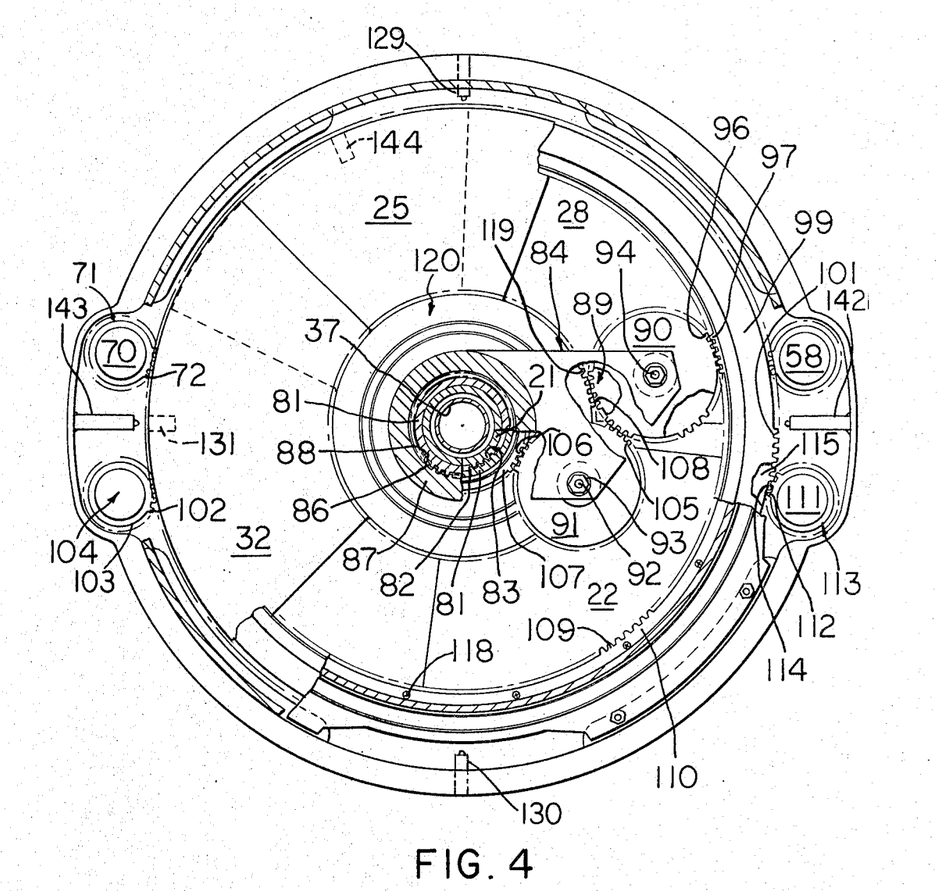
FIGURE 4 is a sectional view, partly in plan, taken substantially along the line 4—4 of FIGURE 3.

As shown in FIGURES 3 and 4, an annular support member 81, which rests on the inner race of the bearing 26, has teeth 82 at its lower inner end for meshing with teeth 83 on the shaft 21 whereby the hub 18 drives the member 81. A gear carrier 84 is supported on a flange 85 of the support member 81. The gear carrier 84 has teeth 86 on its hub 87 for cooperation with teeth 88 on the upper outer end of the support member 81. This arrangement results in the gear carrier 84 being rotated in the same direction as the rotor hub 18 and the connecting shaft 21.

The gear carrier 84 has gears 89, 90, and 91 rotatably mounted thereon in the same manner as the gears 45, 46, and 47 are rotatably mounted on the gear carrier 41. The gear 91 is rotatably mounted by a bearing (not shown) on a stud 92, which has its upper end threaded to receive a nut 93 for securing the stud 92 to the carrier 84. Likewise, the gears 89 and 90 are rotatably mounted by bearings (not shown) on a stud 94, which has its upper end threaded to receive a nut 95 for attaching the stud 94 to the gear carrier 84.

The gears 90 and 91 are disposed in a horizontal plane, which is spaced vertically above the gear 89, and function as planet gears. The planet gear 90 has teeth 96 meshing with teeth 97 on the inner wall of an annular member 98, which functions as a ring gear. The annular member 98 is secured to an annular member 99 by suitable fastening means such as bolts 100. The annular member 99 has teeth 101, which mesh with teeth 102 of a gear 103 of a servomotor 104, on its outer wall. Thus, the annular member 98 is normally fixed unless the servomotor 104 is energized whereby the annular member or ring gear 98 is moved with respect to the planet gears 90 and 91.

The teeth 96 of the planet gear 90 also mesh with teeth 105 on the planet gear 91. The teeth 105 of the gear 91 also mesh with teeth 106 on an annular member 107, which functions as a sun gear. The annular member 107 is secured to the hub 33 of the arcuate member 25 by suitable fastening means such as bolts (not shown).

Thus, with the carrier 84 being rotated clockwise by clockwise rotation of the hub 18, the planet gear 90 is rotated counter-clockwise about the stud 94 because of engagement of the teeth 96 on the planet gear 90 with the teeth 97 on the normally fixed annular member 98. Counter-clockwise rotation of the planet gear 90 results in clockwise rotation of the planet gear 91 about the stud 92. The clockwise rotation of the planet gear 91 drives the annular member 107 counter-clockwise about the axis of the shaft 21 whereby the arcuate member 25 is rotated counter-clockwise, which is opposite to the direction of rotation of the rotor hub 18.

The relation of the number of teeth 96 on the planet gear 90, the number of teeth 97 on the annular member 98, the number of teeth 105 on the planet gear 91, and the number of teeth 106 on the annular member 107 is selected so that the arcuate member 25 rotates at three times the angular velocity of the rotor hub 18. Of course, if the number of blades were other than three, then the relationship of the number of teeth would be varied so that the angular velocity of the arcuate member 25 would be equal to the product of the angular velocity of the rotor hub 18 and the number of blades attached to the rotor hub 18.

Because of the connection of the annular member 98 to the servomotor 104, energization of the servomotor 104 causes movement of the annular member 98 with respect to the remainder of the gears with which it cooperates. As a result, the arcuate member 25 is moved relative to the arcuate members 22, 28, and 32 whenever the servomotor 104 is energized.

The gear 89 has teeth 108 meshing with teeth 109 on the inner wall of an annular member 110, which functions as a ring gear. The annular member 110 is normally fixed but may be moved with respect to the gear 89 whenever a servomotor 111 is energized. The servomotor 111 is connected to the annular member 110 by having teeth 112 on a connected gear 113 meshing with teeth 114 (see FIGURE 3) on the outer wall of an annular member 115. The annular member 115 is connected to one end of an annular member 116 by suitable fastening means such as bolts 117 while the other end of the member 116 is connected to the annular member 110 by suitable fastening means such as bolts 118.

The teeth 108 of the planet gear 89 also mesh with teeth 119 (see FIGURE 4) on a sun gear 120, which is attached by suitable fastening means such as bolts (not shown) to the arcuate member 32. Thus, when the gear carrier 84 is rotating clockwise because of clockwise rotation of the rotor hub 18, the planet gear 89, which is disposed beneath the gear 90 on the stud 94, rotates counter-clockwise about the stud 94. This results in the sun gear 120 being rotated clockwise about the axis of the shaft 21 so that the arcuate member 32 is rotated in the same direction as the rotor hub 18.

The relation of the number of the teeth 109 on the annular member 110, the number of the teeth 108 on the planet gear 89, and the number of the teeth 119 on the sun gear 120 is arranged so that the arcuate member 32 rotates at three times the angular velocity of the rotor hub 18. Of course, if the number of blades were other than three, then the relationship of the number of the teeth would be varied so that the angular velocity of the arcuate member 32 would be equal to the product of the angular velocity of the rotor hub 18 and the number of rotor blades attached to the rotor hub 18.

If the servomotor 111 is energized, the annular member 110 is moved relative to the planet gear 89 and the sun gear 120 whereby the arcuate member 32 is moved relative to the arcuate members 22, 25, and 28. However, the annular member 110 is fixed unless the servomotor 111 is energized.

The forcing, created by the rotor blades 15, 16, and 17 at the rotor hub, has an elliptical locus. If it is desired to cancel out the forcing in a longitudinal-lateral plane, this forcing may be considered as having a longitudinal component and a lateral component. The longitudinal component will be sensed by the accelerometer 38, which has its sensing axis positioned in the longitudinal direction, while the lateral component will be sensed by the accelerometer 39, which has its sensing axis disposed in the lateral direction.

The arcuate members 28 and 32, which function as weights, are utilized to substantially balance out the longitudinal component of the vibrations created at the rotor hub 18 in the longitudinal-lateral plane. The arcuate members 22 and 25, which are rotated in the opposite direction to the rotation of the hub 18 and the arcuate members 28 and 32, are employed to substantially balance out the lateral component of the vibrations created at the rotor hub 18 in the longitudinal-lateral plane by the rotor blades 15, 16, and 17. Furthermore, since the arcuate members 22 and 25 rotate in the opposite direction to the arcuate members 28 and 32, their counter-rotating components of different value actually create an elliptical locus.

By moving the arcuate members 22 and 25 relative to each other, the amplitude of the component, which is produced by the resultant centrifugal force of the members 22 and 25 may be varied. Thus, if the members 22 and 25 are moved closer to each other, the amplitude of the component increases. When the arcuate members 22 and 25 are disposed above each other, the maximum amplitude of the centrifugal force, which is created by the arcuate members 22 and 25, occurs.

Likewise, the amplitude of the component created by the arcuate members 28 and 32 may be varied by moving the arcuate members 28 and 32 toward or away from each other. If the members 28 and 32 are moved toward each other, the amplitude of the resultant centrifugal force created by the members 28 and 32 increases. The maximum amplitude, created by the members 28 and 32, occurs when they are disposed above each other. Furthermore, it is necessary to have the phase of the resultant centrifugal force created by the arcuate members 28 and 32 such that it is directly opposite to that of the longitudinal component of the forcing at the rotor hub 18. Thus, it is necessary to move the arcuate members 28 and 32 by driving them both in either the direction of rotation or by driving them both in the opposite direction.

Similarly, it is desired that the phase of resultant centrifugal force created by the arcuate members 22 and 25 be substantially directly opposed to that of the lateral component of the forcing created at the rotor hub 18. Accordingly, the arcuate members 22 and 25 are moved by driving them both in either direction depending upon the phase of the lateral component of the forcing at the rotor hub 18.

In order to provide this relative movement of the arcuate members 22, 25, 28, and 32 relative to each other, the servomotors 58, 70, 104, and 111 are utilized. The energization of the servomotors and their direction of rotation depends upon the vibration forces sensed by each of the accelerometers 38 and 39.

Figure 6:
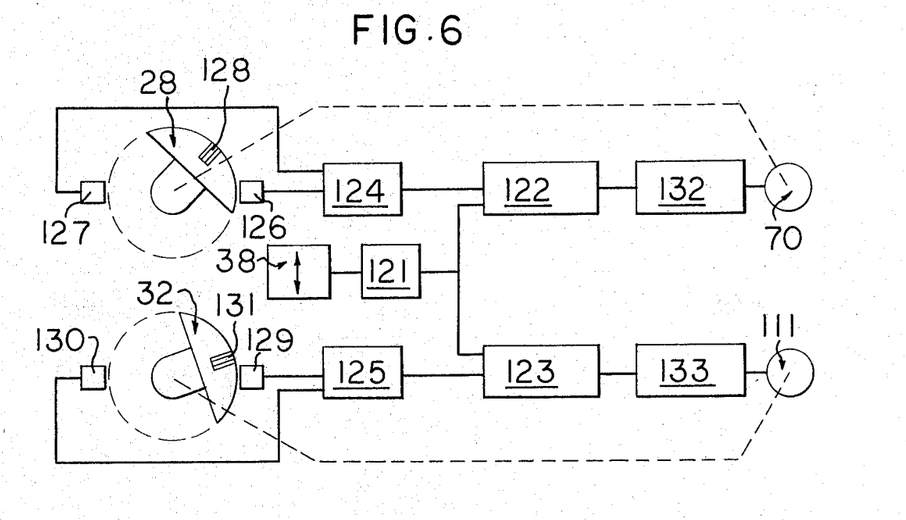
FIGURE 6 is a schematic block diagram of a portion of an electrical sensing system of the present invention.

Referring to FIGURE 6, there is shown a block diagram for energizing the servomotors 70 and 111 in conjunction with the accelerometer 38, which has its sensing axis disposed in the longitudinal direction. The output of the accelerometer 38 is connected to the input of a band pass filter and phase control 121, which passes only the forces having a frequency equal to the frequency of the arcuate members 28 and 32. In the present arrangement, this is a frequency which, as set forth above, is usually equal to three times the angular velocity of the hub 18. The output of the filter and phase control 121 is connected to a pair of demodulators or phase detectors 122 and 123. The demodulator 122 also receives the output of a bi-stable oscillator 124 as an input while the demodulator 123 receives the output of a bi-stable oscillator 125 as an input.

The bi-stable oscillator 124 has inputs from diametrically opposed magnetic pockoffs 126 and 127. The arcuate member 28 has a magnetic insert 128, which causes energization of each of the magnetic pickoffs 126 and 127 as the insert 128 passes each of the pickoffs 126 and 127.

The bi-stable oscillator 125 has inputs from diametrically opposed magnetic pickoffs 129 and 130. The arcuate member 32 has a magnetic insert 131, which energizes each of the magnetic pickoffs 129 and 130 as the insert 131 passes it.

The output of the demodulator or phase detector 122 is connected through a filter and power amplifier 132 to the servomotor 70. The output of the phase detector or demodulator 123 is connected through a filter and power amplifier 133 to the servomotor 111.

The accelerometer 38 senses the timing of the passage of the vector sum of all of the accelerations due to the vibration forces at the rotor hub 18 in the longitudinal direction in the longitudinal-lateral plane. The magnetic pickoffs 126 and 127 sense the timing of the passage of the arcuate member 28 while the magnetic pickoffs 129 and 130 sense the timing of the passage of the arcuate member 32. The phase control 121 is adjusted to allow for the phase response of the pylon, other phase lags in the system, and the location of the magnetic pickoffs 126, 127, 129, and 130 so that the polarity of each of the outputs of the demodulator 122 and the demodulator 123 is correct to move the arcuate members 28 and 32, respectively, in a direction away from the vector sum. This is necessary for the arcuate members 28 and 32, which are functioning as weights, to produce a resultant centrifugal force opposing the vibration forces at the rotor hub 18 in the longitudinal direction.

If either of the weights 28 and 32 is moved beyond the position in which it produces the desired centrifugal force to overcome the longitudinal component of the vibrations, the vector sum of the forces in the longitudinal direction reappears on the opposite side; the accelerometer 38 senses this change and creates the proper signal at the demodulators 122 and 123 to move both of the weights 28 and 32.

If the force created by the arcuate members 28 and 32 is insufficient to overcome the longitudinal component of the vibration forces at the rotor hub 18, the arcuate members 28 and 32 move to the position in which they are disposed above each other and remain there. Thus, the arcuate members 28 and 32 move to the position in which they are disposed diametrically opposite to the vector sum of the longitudinal component.

Figure 7:
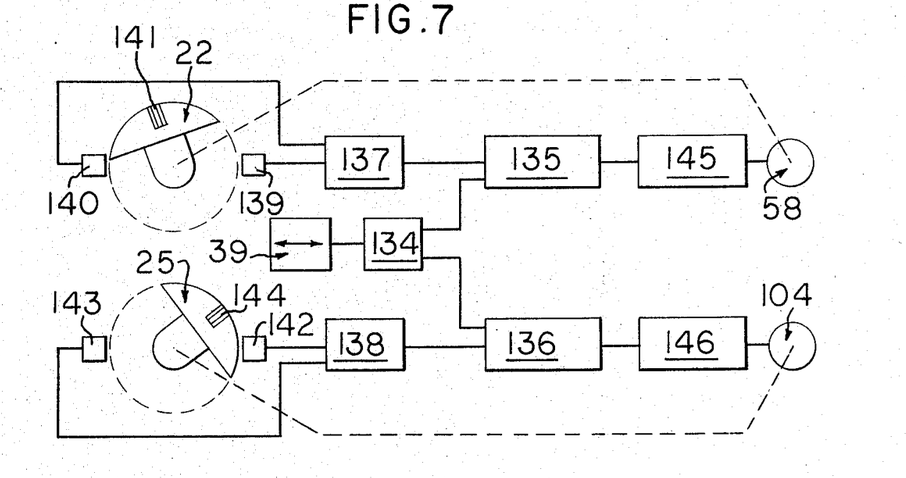
FIGURE 7 is a schematic block diagram of another portion of the electrical sensing system of the present invention.

The accelerometer 39 is simultaneously sensing the lateral component of the vibration forces at the rotor hub 18. The accelerometer 39 is connected to a similar type of circuit as that used with accelerometer 38; through this circuitry, the accelerometer 39 controls the servomotors 58 and 104.

Referring to FIGURE 7, the accelerometer 39 has its output connected to a band pass filter and phase control 134, which permits only forces having a frequency equal to the frequency of the arcuate members 22 and 25. In this situation, this is a frequency which, as set forth above, is usually equal to three times the angular velocity of the rotor hub 18. The output of the filter and phase control 134 is an input to demodulators or phase detectors 135 and 136. The demodulator 135 also receives an input of a bi-stable oscillator 137 while the demodulator 136 receives an input from the output of a bi-stable oscillator 138.

The bi-stable oscillator 137 has inputs from diametrically opposed magnetic pickoffs 139 and 140. Each of the pickoffs 139 and 140 is energized each time that a magnetic insert 141 in the arcuate member 22 passes it. The bi-stable oscillator 138 has inputs from the diametrically opposed magnetic pickoffs 142 and 143. Each of the pickoffs 142 and 143 is energized whenever a magnetic insert 144 in the arcuate member 25 passes it.

The output of the demodulator 135 controls the servomotor 58 by being connected thereto through a filter and power amplifier 145. Similarly, the demodulator 136 controls the servomotor 104 by having its output connected thereto through a filter and power amplifier 146.

The accelerometer 39 senses the timing of the passage of the vector sum of all the vibrations at the rotor hub 18 in the lateral direction. The magnetic pickoffs 139 and 140 sense the timing of the arcuate member 22 while the magnetic pickoffs 142 and 143 sense the timing of the passage of the arcuate member 25.

The phase control 134 is adjusted to allow for the phase response of the pylon, other phase lags in the system, and the location of the magnetic pickoffs 139, 140, 142, and 143 so that the polarity of the output of the demodulator 135 is correct to move the arcuate member 22 in the desired direction away from the vector sum of the lateral component of the vibrations created at the rotor hub 18 and the output of the demodulator 136 has the correct polarity to move the arcuate member 25 in the direction away from the vector sum of the lateral component of the vibrations created at the rotor hub 18.

The operation of this invention and, particularly, the operational relationship of the systems of FIGURES 6 and 7 with the systems of FIGURES 3, 4, and 5 will now be described. Since the forces sensed by the accelerometer 38 in the longitudinal direction are essentially periodic, the output of the accelerometer 38 is essentially periodic. The accelerometer output is applied to the filter and phase control 121.

The filter and phase control 121 includes a bandpass filter such as, for example, the bandpass filter described on pages 505–507 (note particularly part (E) of FIG. 20–10) of Fundamentals of Electronics by Matthew Mandl, published by Prentice-Hall, Inc., Englewood Cliffs, N.J., 1960. However, it should be understood that the selected frequency attenuation of the filter is based upon the frequency of the vibration forces which are to be controlled by the vibration absorber of this invention, and the output of the filter and phase control 121 will be sinusoidal.

The filter and phase control 121 also includes a phase control such as, for example, the phase shifter illustrated in FIG. 4.37 and described on pages 139–140 of Waveforms, M.I.T. Radiation Laboratory Series, vol. 19, by Chance, Hughes, MacNichol, Sayre and Williams, published by Boston Technical Lithographers, Inc., Lexington, Mass., 1963. The output of the filter is connected to the input of the phase shifter in a manner well known to those skilled in the art.

The output of the filter and phase control 121 is one of the inputs to the demodulator 122. The other input is supplied by the bi-stable oscillator 124 in the form of a square wave. A bi-stable oscillator, also known as a bi-stable multivibrator or flip-flop circuit, that can be utilized is illustrated in FIGURE 77 and described on pages 44–45 of R.C.A. Transistor Manual (Tech. Series SC–10), published by R.C.A., 1962. However, it should be understood that many well-known forms of bi-stable oscillators may be used in a manner well known to those skilled in the art without departing from the scope of this invention.

As set forth above, the outputs of the bi-stable oscillator 124 and the filter and phase control 121 are applied to the demodulator 122 which may be of the type shown in FIGURE 14.14 and described on pages 512–513 of Waveforms, supra. Since the output of the bi-stable oscillator 124 is a constant amplitude from peak to peak, it is the signal preferably used as the carrier or reference signal input to the demodulator 122.

It should be understood that other well-known demodulators can be utilized such as the demodulator shown in FIGURE 14.16 of Waveforms, supra. The application of the inputs to the demodulator 122 and its output to the amplifier 132 is well known to those skilled in the art. As provided hereinabove, the output of the demodulator 122 is applied to the motor 70 through the power amplifier 132.

With reference to FIGURES 6 and 7 hereof, it should be understood that the filter and phase controls 121 and 134 can be the same type, and in like manner, the bi-stable oscillators 124, 125, 137, and 138, and the demodulators 122, 123, 135, and 136, also can be the same type. Additionally, it should be understood that the relationships of bi-stable oscillator 125 and demodulator 123 to the pickoffs 129 and 130 and the filter and phase control 121 can be the same as the above-described relationships of the bi-stable oscillator 124 and demodulator 122 to the pickoffs 126 and 127 and the filter and phase control 121. As illustrated, the relationships of the circuit elements of FIGURE 7 also can be the same as the relationships of the circuit elements of FIGURE 6. Accordingly, it is considered that the additional elements and their relationships need not be further described in detail.

From the foregoing, it can be understood that the accelerometer signal applied to demodulator 122 represents, with respect to time, the longitudinal component of the resultant of all longitudinal components of vibrations whose frequencies are not attenuated by the filter and phase control 121. The vibratory effect of the rotating weights is included in the resultant longitudinal component represented by the essentially sine wave signal applied to the demodulator 122 from the accelerometer 38.

The bi-stable signal applied to the demodulator 122 from the bi-stable oscillator 124 represents, with respect to time, the position of the centrifugal force vector of rotating weight 28. Accordingly, the demodulator 122 receives from the accelerometer 38 the signal representing the longitudinal component of vibratory forces to be absorbed and compares the phase thereof, with respect to time, with the signal representing the position of the centrifugal force vector of the rotating member 28 as received from the bi-stable oscillator 124.

The output of the demodulator 122 is dependent upon the phase relationships of the accelerometer sine wave and the bi-stable square wave. That is, if the inputs to the demodulator are 90° out of phase, the output of the demodulator 122 is zero. However, if the inputs to the demodulator 122 are in phase or leading or lagging the in-phase condition by an amount less than 90°, the output of the demodulator is positive and drives the motor 70 to advance the position of the member 28 with respect to its direction of rotation. As long as this phase relationship exists, the position of the member 28 will be advanced and will stop only if the amplitude of the accelerometer signal becomes zero due to absorption of the vibration forces. However, if the phase relationship changes, the demodulator output to the motor will either become zero due to a 90° out-of-phase relationship or will change to a negative polarity to retard the position of member 28 as hereinafter described.

If the inputs to the demodulator 122 are 180° out of phase or leading or lagging the 180° out-of-phase condition by an amount less than 90°, the output of the demodulator 122 is negative and drives the motor 70 to retard the position of the member 28 with respect to its direction of rotation. As long as this phase relationship exists, the position of the member 28 will be retarded and as set forth above will stop only if the amplitude of the accelerometer signal becomes zero due to absorption of the vibration forces. However, as set forth above, if the phase relationship changes, the demodulator output will either be zero due to a 90° out-of-phase relationship or will change to a positive polarity to advance the position of member 28.

It should be understood that adjustment of weight 32 through the square wave associated therewith is accomplished in the same manner with respect to the accelerometer sine wave as adjustment of weight 28.

It should also be understood that adjustment of the weights 22 and 25 is accomplished in the same manner as that of the weights 28 and 32 by taking into account the counter-rotation thereof with respect to weights 28 and 32 so as to absorb the resultant lateral component of vibratory forces.

The nature of the accelerometer sine wave and the bi-stable square wave may be readily understood by considering, for example, the clockwise rotation of the members 28 and 32. The nature of the square waves is dependent upon the passage of the members 28 and 32 with their respective magnetic inserts 128 and 131 by their respective sensors 126, 127, 129, and 130. Let us first consider the sensors 126 and 127. They can be positioned so that sensor 126 is in a most forward longitudinal position and sensor 127 is in a most rearward longitudinal position which, for purposes of clarity, may be considered twelve and six o'clock, respectively. However, as set forth hereinabove, these sensors may be positioned otherwise for convenience and thereafter compensated for in the phase control 121.

For purposes of example, we may further designate sensor 126 to be the positive sensor and sensor 127 the negative sensor. That is, as the member 28 passes the sensor 126, the magnetic insert 128 will cause a signal from sensor 126 which switches the bi-stable oscillator 124 so that its square wave output is positive. Thus, the square wave will be positive until the member 28 passes the negative sensor 127 and switches the bi-stable oscillator to negative. Obviously, if the sensors 126 and 127 are diametrically opposite to each other, each half of the square wave will represent 180° of rotation of the member 28. Accordingly, the square waves of the bi-stable oscillators 124 and 125, at any instant in time, may be graphically portrayed; i.e., if member 28 is at three o'clock, it is one-half complete with its positive excursion at time zero and will switch negative in another 90° and if member 32 is at six o'clock, the square wave has just switched negative at time zero and will switch positive in another 180°.

The accelerometer signal of accelerometer 38 represents the longitudinal component of the vector sum of all the forces. This includes the external vibratory force desired to be absorbed and the centrifugal forces of the rotating weights which for purposes of this example are the clockwise rotating members 28 and 32. The external force to be absorbed does not rotate. Accordingly, the position and magnitude of the vector sum, at any instant in time, will be dependent upon the positions of each of the members 28 and 32 with respect to the non-rotating vector of the external force. Thus, at any instant in time, the vector sum is either zero or has a direct positional relationship with respect to the vectors of the members 28 and 32.

Since the sine wave of the accelerometer 38 represents the longitudinal component of the vector sum, its amplitude and phase can be graphically portrayed with respect to the above-described graphic portrayel of the square waves associated with members 28 and 32. That is, the amplitude of the longitudinal component of the vector sum as represented by the sine wave is dependent upon the position and magnitude of the vector sum at any instant in time. In like manner, the phase of the sine wave is also dependent upon the position of the vector sum. For example, if, in a selected instant in time, the vector sum is at eleven o'clock, it can be considered that the longitudinal component of the vector sum will be at its maximum positive 30° later and can be so graphically illustrated.

As set forth above, if the graphic portrayel illustrates that the square wave associated with the member 28, for example, is 90° out of phase with the sine wave, the demodulator output 122 will be zero and the weight will not be moved. If, however, the square wave is in phase or is leading or lagging the in-phase condition by less than 90°, the member 28 will be advanced. Conversely, as set forth above, if the square wave is 180° out of phase or is leading or lagging the 180° out-of-phase condition by less than 90°, the member 28 will be retarded. Of course, as set forth above, if the forces are balanced, there is no longitudinal component, accelerometer output, or demodulator output.

It should be understood from the foregoing that, although the members 28 and 32 are positioned to balance out the magnitude and phase of the longitudinal component of the vector sum of the vibratory forces, their position may be such as to result in centrifugal force vectors having lateral components. These lateral components may aid or aggravate the condition of the lateral component of the vector sum of the vibratory forces. Of course, the weights 22 and 25 are utilized to balance out magnitude and phase of such forces and, in balancing out the lateral components, their positions may be such as to have affected in like manner the condition of the longitudinal component as balanced out by the weights 28 and 32.

While the accelerometers 38 and 39 have been shown as positioned on top of the housing 38, they could be disposed near the top of the non-rotating pylon if desired. While the vibratoion absorber has been shown as cancelling out the vibrations created in a longitudinal-lateral plane, it should be understood that the arcuate members 22, 25, 28, and 32 could be arranged to cancel forces in a vertical-longitudinal or a vertical-lateral plane. In this arrangement, the arcuate members would be rotating about axes at right angles to the axis of rotation of the rotor hub 18. Furthermore, it would be necessary to symmetrically position the arcuate members 22, 25, 28, and 32 about the axis of rotation of the rotor hub 18.

While the vibration absorber of the present invention has been described with its use on a rotor hub having a plurality of articulated rotor blades, it should be understood that the vibration absorber of the present invention may be utilized on any device having a rotating hub and a plurality of radial members, which create vibrations at the rotor hub when rotating. Thus, for example, the vibration absorber of the present invention could be utilized on a ship propeller or an aircraft propeller, for example. Additionally, this invention could, for example, be placed at any location in a device subjected to periodic vibrations by employing any suitably rotating shaft to absorb vibrations sensed by accelerometers located at any desired location such as, for example, the rotor hub or cabin of a helicopter.

While the arcuate members 22 and 25 have been shown as having the same locus as the arcuate members 28 and 32, it should be understood that the arcuate members 22 and 25 could have a different locus than the locus of the arcuate members 28 and 32. While the arcuate members 22, 25, 28, and 32 have been shown and described as being driven through a gearing arrangement from the rotor hub 18, it will be understood that other suitable rotating means such as synchronous motors connected to each of the arcuate members 22, 25, 28, and 32 and driven by a generator connected to the rotor hub 18 for maintaining a constant ratio with the angular velocity of the hub 18, for example, could be employed.

It should be understood that the arcuate members members 22, 25, 28, and 32 could be rotated at an angular velocity other than an angular velocity equal to the product of the rotor hub 18 and the number of radial members attached to the hub 18. It is only necessary that the angular velocity of the arcuate members 22, 25, 28, and 32 be a constant ratio of the angular velocity of the rotor hub 18. The selected angular velocity of the arcuate members 22, 25, 28, and 32 would be dependent on the frequency of the forcing, which it is desired to substantially balance out by the vibration absorber of the present invention.

While the accelerometers 38 and 39 have been described as sensing longitudinal and lateral components, it should be understood that the accelerometers 38 and 39 could have their sensing axes arranged in any two directions, which are perpendicular to each other, in the plane having the vibrations, which it is desired to substantially balance out.

An advantage of this invention is that it provides a positive indication of the location of each of the weights. Another advantage of this invention is that each of the weights is positively positioned in response to a change in either phase or amplitude of the vibrations created at the rotor hub by the attached rotor blades. A further advantage of this invention is that a change in rotor speed does not affect the vibration absorber. Still another advantage of this invention is that the arcuate members need not fight centrifugal forces since their distances from the axis of rotation is always the same.

For purposes of exemplification, a particular embodiment of the invention has been shown and described according to the present understanding thereof. However, it will be apparent that changes and modifications of the arrangement and construction of the parts thereof may be resorted to without departing from the spirit and scope of the invention.

We claim:

1. In combination, a rotating hub, a plurality of members attached to said hub and extending radially therefrom, and a vibration absorber to substantially balance out vibrations created at said hub in one plane by said radial members, said vibration absorber including a first set of rotatably mounted weight means, a second set of rotatably mounted weight means, each of said sets of weight means including at least two equal weights, means connected to each of said weights of said first set of weight means to cause rotation of said first set of weight means in one direction at an angular velocity equal to a constant ratio of the angular velocity of said hub, means connected to each of said weights of said second set of weight means to cause rotation of said second set of weight means in a direction opposite to the direction of rotation of said first set of weight means at an angular velocity equal to a constant ratio of the angular velocity of said hub, said axes of rotation of said weights being substantially perpendicular to said one plane, and means cooperating with each of said connected means to cause relative angular movement of one or more of said weights in response to a change in phase or amplitude of the vibrations created at said hub in said one plane by said radial members.

2. In combination, a rotating hub, a plurality of members attached to said hub and extending radially therefrom, and a vibration absorber to substantially balance out vibrations created at said hub in one plane by said radial members, said vibration absorber including a first set of rotatably mounted weight means, a second set of rotatably mounted weight means, each of said sets of weight means including at least two equal weights, means connecting said weights of said first set of weight means to said hub to cause rotation of said first set of weight means in one direction at an angular velocity equal to a constant ratio of the angular velocity of said hub, means connecting said weights of said second set of weight means to said hub to cause rotation of said second set of weight means in a direction opposite to the direction of rotation of said first set of weight means at an angular velocity equal to a constant ratio of the angular velocity of said hub, said axes of rotation of said weights being substantially perpendicular to said one plane, and means cooperating with each of said connecting means to cause relative angular movement of one or more of said weights in response to a change in phase or amplitude of the vibrations created at said hub in said one plane by said radial members.

3. In combination, a rotating hub, a plurality of members attached to said hub and extending radially therefrom, and a vibration absorber to substantially balance out vibrations created at said hub in one plane by said radial members, said vibration absorber including a first set of at least two equal weights rotating in one direction and a second set of at least two other equal weights rotating in a direction opposite to the direction of rotation of said first set of weights, means connected to each of said first set of weights for rotating said first set of weights in said one direction at an angular velocity equal to a constant ratio of the angular velocity of said hub, means connected to each of said second set of weights for rotating said second set of weights in said opposite direction at an angular velocity equal to a constant ratio of the angular velocity of said hub, said axes of rotation of said weights being substantially perpendicular to said one plane, and means connected to each of said weights to cause relative angular movement of one or more of said weights in response to a change in phase or amplitude of the vibrations created at said hub in said one plane by said radial members.

4. In combination, a rotating hub, a plurality of members attached to said hub and extending radially therefrom, and a vibration absorber to substantially balance out vibrations created at said hub in one plane by said radial members, said vibration absorber including a first set of at least two equal weights rotating in one direction and a second set of at least two other equal weights rotating in a direction opposite to the direction of rotation of said first set of weights, means connecting said first set of weights to said hub for rotating said first set of weights in said one direction at an angular velocity equal to a constant ratio of the angular velocity of said hub, means connecting said second set of weights to said hub for rotating said second set of weights in said opposite direction at an angular velocity equal to a constant ratio of the angular velocity of said hub, said axes of rotation of said weights being substantially perpendicular to said one plane, and means connected to each of said weights to cause relative angular movement of one or more of said weights in response to a change in phase or amplitude of the vibrations created at said hub in said one plane by said radial members.

5. In combination, a rotating hub, a plurality of members attached to said hub and extending radially therefrom, and a vibration absorber to substantially balance out vibrations created at said hub in one plane by said radial members, said vibration absorber including a first set of at least two equal weights rotating in one direction and a second set of at least two other equal weights rotating in the opposite direction, means connected to each of said first set of weights for rotating said first set of weights in said one direction at an angular velocity equal to a constant ratio of the angular velocity of said hub, means connected to each of said second set of weights for rotating said second set of weights in said opposite direction at an angular velocity equal to a constant ratio of the angular velocity of said hub, said axes of rotation of said weights being substantially perpendicular to said one plane, each of said connected means including gearing means to produce the desired angular velocity of said connected weight, and means to cause angular movement with respect to each other of portions of said gearing means of one or more of said connected means to move said connected weight in response to a change in phase or amplitude of the vibrations created at said hub in said one plane by said radial members.

6. In combination, a rotating hub, a plurality of members attached to said hub and extending radially therefrom, and a vibration absorber to substantially balance out vibrations created at said hub in one plane by said radial members, said vibration absorber including a first set of at least two equal weights in one direction and a second set of at least two other equal weights rotating in the opposite direction, means connecting each of said first set of weights to said hub for rotating said first set of weights in said one direction at an angular velocity equal to a constant ratio of the angular velocity of said hub, means connecting each of said second set of weights to said hub for rotating said second set of weights in said opposite direction at an angular velocity equal to a constant ratio of the angular velocity of said hub, said axes of rotation of said weights being substantially perpendicular to said one plane, each of said connecting means including gearing means to produce the desired angular velocity of said connected weight, and means to cause angular movement with respect to each other of portions of said gearing means of one or more of said connecting means to move said connected weight in response to a change in phase or amplitude of the vibrations created at said hub in said one plane by said radial members.

7. In combination, a rotating hub, a plurality of members attached to said hub and extending radially therefrom, and a vibration absorber to substantially balance out vibrations created at said hub in one plane by said radial members, said vibration absorber including a first set of at least two equal weights rotating in one direction and a second set of at least two other equal weights rotating in the opposite direction, means connected to each of said first set of weights for rotating said first set of weights in said one direction at an angular velocity equal to a constant ratio of the angular velocity of said hub, means connected to each of said second set of weights for rotating said second set of weights in said opposite direction at an angular velocity equal to a constant ratio of the angular velocity of said hub, said axes of rotation of said weights being substantially perpendicular to said one plane, means to cause angular movement of at least one of said weights with respect to the remainder of said weights in response to a change in amplitude of the vibrations created at said hub in said one plane by said radial members, and said last mentioned means causing relative angular movement of one of said sets of weights with respect to the other of said set of weights in response to a change in phase of the vibrations created at said hub in said one plane by said radial members.

8. In combination, a rotating hub, a plurality of members attached to said hub and extending radially therefrom, and a vibration absorber to substantially balance out vibrations created at said hub in one plane by said radial members, said vibration absorber including a first set of at least two equal weights rotating in one direction and a second set of at least two other equal weights rotating in the opposite direction, means connecting said first set of weights to said hub for rotating said first set of weights in said one direction at an angular velocity equal to a constant ratio of the angular velocity of said hub, means connecting said second set of weights to said hub for rotating said second set of weights in said opposite direction at an angular velocity equal to a constant ratio of the angular velocity of said hub, said axes of rotation of said weights being substantially perpendicular to said one plane, means to cause angular movement of at least one of said weights with respect to the remainder of said weights in response to a change in amplitude of the vibrations created at said hub in said one plane by said radial members, and said last mentioned means causing relative movement of one of said sets of weights with respect to the other of said set of weights in response to a change in phase of the vibrations created at said hub in said one plane by said radial members.

9. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of rotatably mounted weight means, a second set of rotatably mounted weight means, each of said sets of weight means including at least two equal weights, means connected to each of said weights of said first set of weight means to cause rotation of said first set of weight means in one direction at an angular velocity equal to a constant ratio of the angular velocity of said rotor hub, means connected to each of said weights of said second set of weight means to cause rotation of said second set of weight means in a direction opposite to the direction of rotation of said first set of weight means at an angular velocity equal to a constant ratio of the angular velocity of said rotor hub, said axes of rotation of said weights being substantially perpendicular to said one plane, means cooperating with each of said connected means to cause relative angular movement of one or more of said weights in response to a change in phase or amplitude of the vibrations created at said rotor hub in said one plane by said rotor blades, and a housing fixed to the aircraft and enclosing said weight means.

10. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of rotatably mounted weight means, a second set of rotatably mounted weight means, each of said sets of weight means including at least two equal weights, means connected to each of said weights of said first set of weight means to cause rotation of said first set of weight means in one direction at an angular velocity equal to the product of the angular velocity of said rotor hub and the number of rotor blades attached thereto, means connected to each of said weight of said second set of weight means to cause rotation of said second set of weight means in a direction opposite to the direction of rotation of said first set of weight means at an angular velocity equal to the product of the angular velocity of said rotor hub and the number of rotor blades attached thereto, said axes of rotation of said weights being substantially perpendicular to said one plane, means cooperating with each of said connected means to cause relative angular movement of one or more of said weights in response to a change in phase or amplitude of the vibrations created at said rotor hub in said one plane by said motor blades, and a housing fixed to the aircraft and enclosing said weight means.

11. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of at least two equal weights rotating in one direction and a second set of at least two other equal weights rotating in the opposite direction, means connected to each of said first set of weights for rotating said first set of weights in said one direction at an angular velocity equal to a constant ratio of the angular velocity of said rotor hub, means connected to each of said second set of weights for rotating said second set of weights in said opposite direction at an angular velocity equal to a constant ratio of the angular velocity of said rotor hub, said axes of rotation of said weights being substantially perpendicular to said one plane, means connected to each of said weights to cause relative angular movement of one or more of said weights in response to a change in phase or amplitude of the vibrations created at said rotor hub in said one plane by said rotor blades, and a housing fixed to the aircraft and enclosing said weights.

12. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of at least two equal weights rotating in one direction and a second set of at least two other equal weights rotating in the opposite direction, means connected to each of said first set of weights for rotating said first set of weights in said one direction at an angular velocity equal to the product of the angular velocity of said rotor hub and the number of rotor blades attached thereto, means connected to each of said second set of weights for rotating said second set of weights in said opposite direction at an angular velocity equal to the product of the angular velocity of said rotor hub and the number of rotor blades attached thereto, said axes of rotation of said weights being substantially perpendicular to said one plane, means connected to each of said weights to cause relative angular movement of one or more of said weights in response to a change in phase or amplitude of the vibrations created at said rotor hub in said one plane by said rotor blades, and a housing fixed to the aircraft and enclosing said weights.

13. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of at least two equal weights rotating in one direction and a second set of at least two other equal weights rotating in the opposite direction, means connected to each of said first set of weights for rotating said first set of weights in said one direction at an angular velocity equal to a constant ratio of the angular velocity of said rotor hub, means connected to each of said second set of weights for rotating said second set of weights in said opposite direction at an angular velocity equal to a constant ratio of the angular velocity of said rotor hub, said axes of rotation of said weights being substantially perpendicular to said one plane, each of said connected means including gearing means to produce the desired angular velocity of said connected weight, means to cause angular movement with respect to each other of portions of said gearing means of one or more of said connected means to move said connected weight in response to a change in phase or amplitude of the vibrations created at said rotor hub in said one plane by said rotor blades, and a housing fixed to the aircraft and enclosing said weights.

14. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of at least two equal weights rotating in one direction and a second set of at least two other equal weights rotating in the opposite direction, means connected to each of said first set of weights for rotating said first set of weights in said one direction at an angular velocity equal to the product of the angular velocity of said rotor hub and the number of rotor blades attached thereto, means connected to each of said second set of weights for rotating said second set of weights in said opposite direction at an angular velocity equal to the product of the angular velocity of said rotor hub and the number of rotor blades attached thereto, said axes of rotation of said weights being substantially perpendicular to said one plane, each of said connected means including gearing means to produce the desired angular velocity of said connected weight, means to cause angular movement with respeect to each other of portions of said gearing means of one or more of said connected means to move said connected weight in response to a change in phase or amplitude of the vibrations created at said rotor hub in said one plane by said rotor blades, and a housing fixed to the aircraft and enclosing said weights.

15. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of at least two equal weights rotating in one direction and a second set of at least two other equal weights rotating in the opposite direction, means connected to each of said first set of weights for rotating said first set of weights in said one direction at an angular velocity equal to a constant ratio of the angular velocity of said rotor hub, means connected to each of said second set of weights for rotating said second set of weights in said opposite direction at an angular velocity equal to a constant ratio of the angular velocity of said rotor hub, said axes of rotation of said weights being substantially perpendicular to said one plane, means to cause angular movement of at least one of said weights with respect to the remainder of said weights in response to a change in amplitude of the vibrations created at said rotor hub in said one plane by said rotor blades, said last mentioned means causing relative angular movement of one of said sets of weights with respect to the other of said set of weights in response to a change in phase of the vibrations created at said rotor hub in said one plane by said rotor blades, and a housing fixed to the aircraft and enclosing said weights.

16. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of at least two equal weights rotating in one direction and a second set of at least two other equal weights rotating in the opposite direction, means connected to each of said first set of weights for rotating said first set of weights in said one direction at an angular velocity equal to the product of the angular velocity of said rotor hub and the number of rotor blades attached thereto, means connected to each of said second set of weights for rotating said second set of weights in said opposite direction at an angular velocity equal to the product of the angular velocity of said rotor hub and the number of rotor blades attached thereto, said axes of rotation of said weights being substantially perpendicular to said one plane, means to cause angular movement of at least one of said weights with respect to the remainder of said weights in response to a change in amplitude of the vibrations created at said rotor hub in said one plane by said rotor blades, said last mentioned means causing relative angular movement of one of said sets of weights with respect to the other of said set of weights in response to a change in phase of the vibrations created at said rotor hub in said one plane by said rotor blades, and a housing fixed to the aircraft and enclosing said weights.

17. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of at least two equal weights rotating in one direction and a second set of at least two other equal weights rotating in the opposite direction, means connected to each of said first set of weights for rotating said first set of weight in said one direction at an angular velocity equal to a constant ratio of the angular velocity of said rotor hub, means connected to each of said second set of weights for rotating said second set of weights in said opposite direction at an angular velocity equal to a constant ratio of the angular velocity of said rotor hub, said axes of rotation of said weights being substantially perpendicular to said one plane, means responsive to vibrations created by said rotor blades at said rotor hub in a first direction in said one plane to produce an output signal proportional to the amplitude of the vibrations in said first direction and in phase therewith, means responsive to vibrations created by said rotor blades at said rotor hub in a second direction in said one plane and substantially perpendicular to said first direction to produce an output signal proportional to the amplitude of the vibrations in said second direction and in phase therewith, said output of said first direction responsive means controlling the positions of each of said first set of weights to substantially balance out the vibrations created at said rotor hub in said first direction by said rotor blade, and said output of said second direction responsive means controlling the positions of each of said second set of weights to substantially balance out the vibrations created at said rotor hub in said second direction by said rotor blades.

18. In a rotary wing aircraft having a rotor hub and a plurality of rotor blades attached to said rotor hub, the improvement comprising a vibration absorber to substantially balance out vibrations created at said rotor hub in one plane by said rotor blades, said vibration absorber including a first set of at least two equal weights rotating in one direction and a second set of at least two other equal weights rotating in the opposite direction, means connected to each of said first set of weights for rotating said first set of weights in said one direction at an angular velocity equal to the product of the angular velocity of said rotor hub and the number of rotor blades attached thereto, means connected to each of said second set of weights for rotating said second set of weights in said opposite direction at an angular velocity equal to the product of the angular velocity of said rotor hub and the number of rotor blades attached thereto, said axes of rotation of said weights being substantially perpendicular to said one plane, means responsive to vibrations created by said rotor blades at said rotor hub in a first direction in said one plane to produce an output signal proportional to the amplitude of the vibrations in said first direction and in phase therewith, means responsive to vibrations created by said rotor blades at said rotor hub in a second direction in said one plane and substantially perpendicular to said first direction to produce an output signal proportional to the amplitude of the vibrations in said second direction and in phase therewith, said output of said first direction responsive means controlling the positions of each of said first set of weights to substantially balance out the vibrations created at said rotor hub in said first direction by said rotor blade, and said output of said second direction responsive means controlling the positions of each of said second set of weights to substantially balance out the vibrations created at said rotor hub in said second direction by said rotor blades.

References Cited by the Examiner

UNITED STATES PATENTS

| | | | |
|---|---|---|---|
| 2,031,286 | 2/1936 | Stern et al. | 74—574 X |
| 2,353,681 | 7/1944 | Martin et al. | 170—177 |
| 2,371,984 | 3/1945 | Forsyth | 74—574 |
| 2,576,105 | 11/1951 | Childs | 170—159 |
| 2,611,557 | 9/1952 | Donovan | 244—17.11 |
| 2,771,240 | 11/1956 | Gurn | 74—573 X |
| 2,882,745 | 4/1959 | Comstock | 74—573 |
| 2,915,918 | 12/1959 | Comstock et al. | 74—573 |
| 3,149,502 | 9/1964 | Caruso et al. | 74—573 |

FOREIGN PATENTS 1,202,949   7/1959   France.

MARK NEWMAN, *Primary Examiner.*

JULIUS E. WEST, *Examiner.*

W. E. BURNS, *Assistant Examiner.*